Nov. 8, 1960  J. J. RYAN  2,959,459
FLIGHT RECORDER
Filed Aug. 4, 1953  7 Sheets-Sheet 1

INVENTOR
James J. Ryan
BY Fisher & Christen,
ATTORNEYS

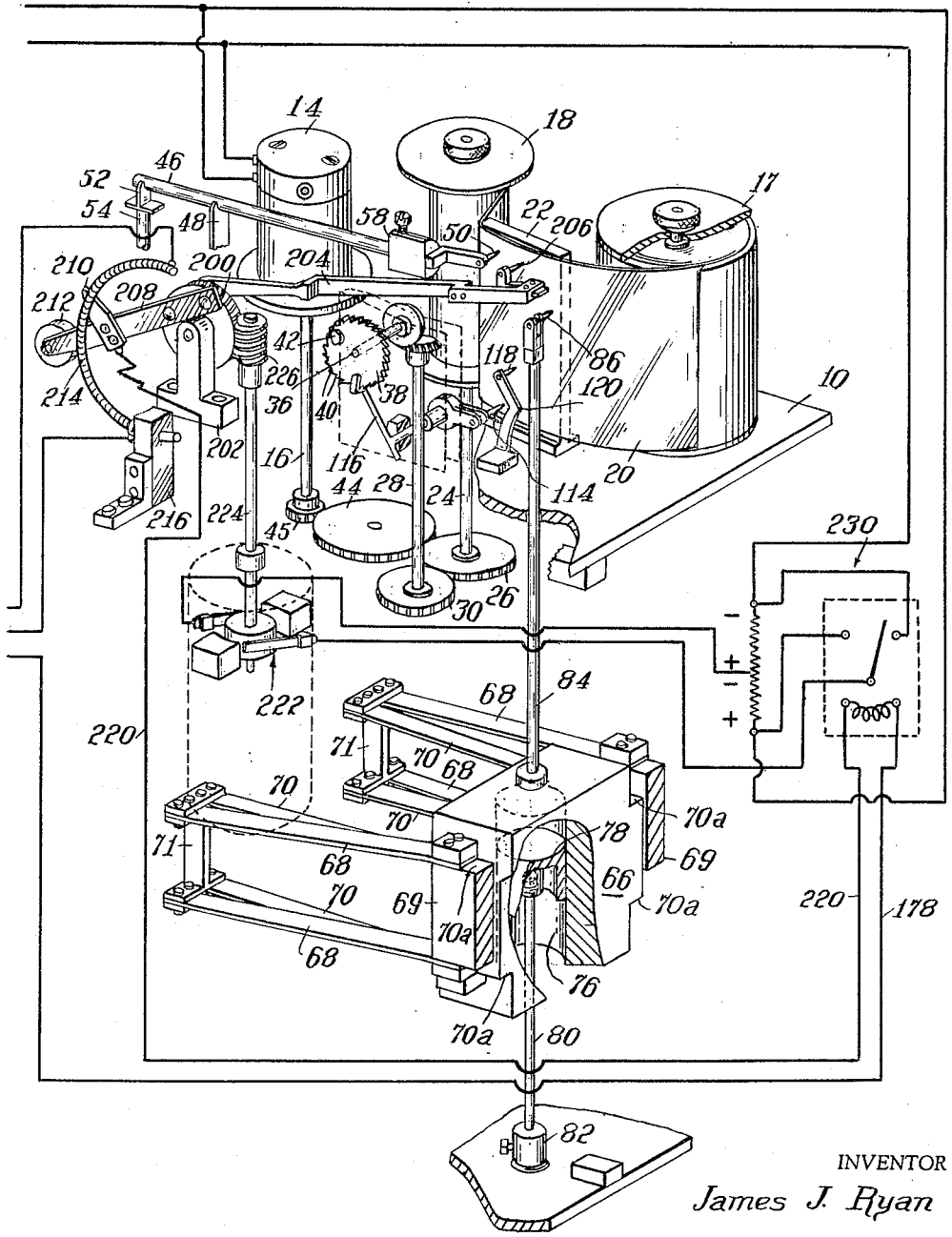

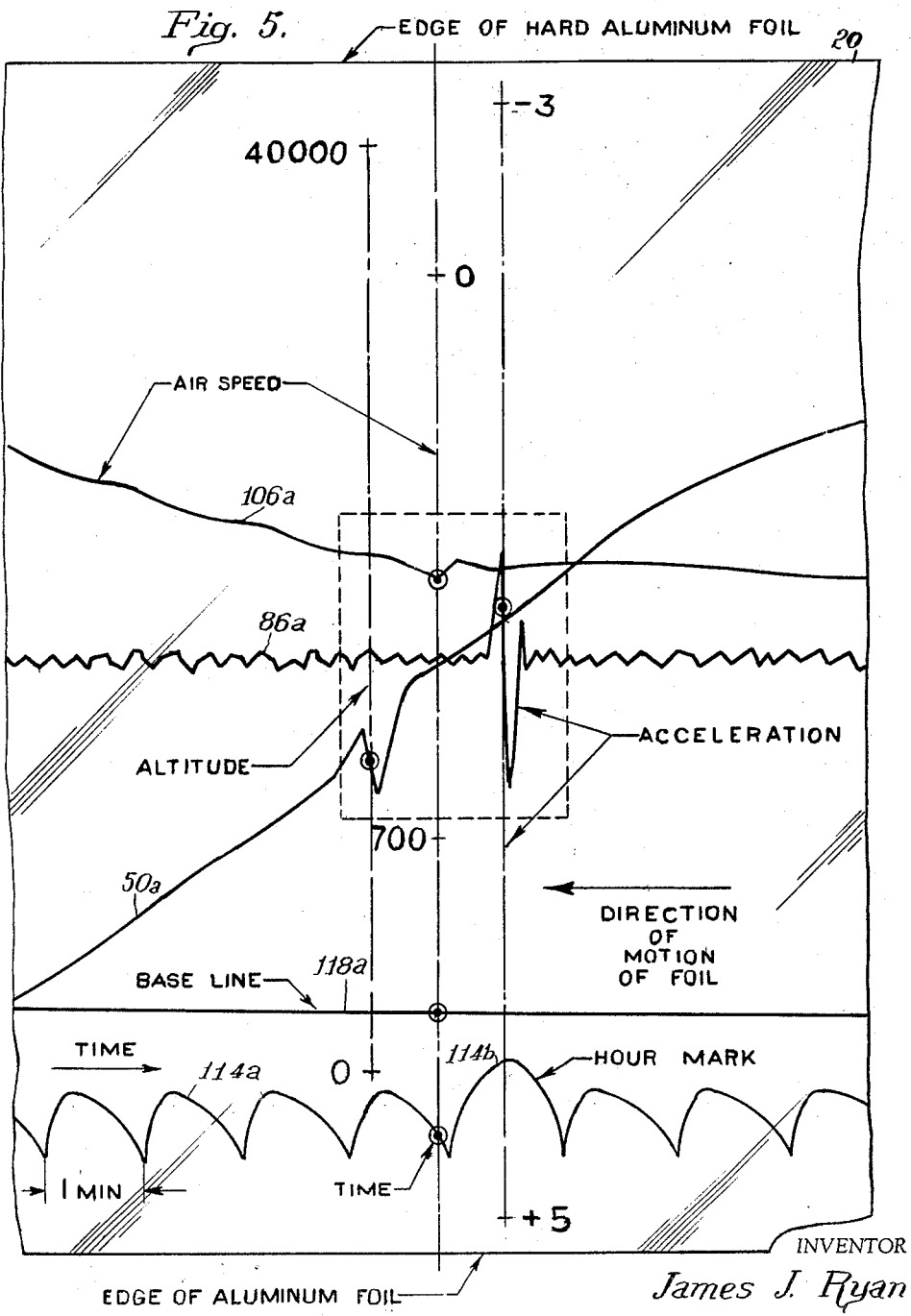

Nov. 8, 1960

J. J. RYAN 2,959,459

FLIGHT RECORDER

Filed Aug. 4, 1953

INVENTOR
James J. Ryan

BY Fisher & Christen,

ATTORNEYS

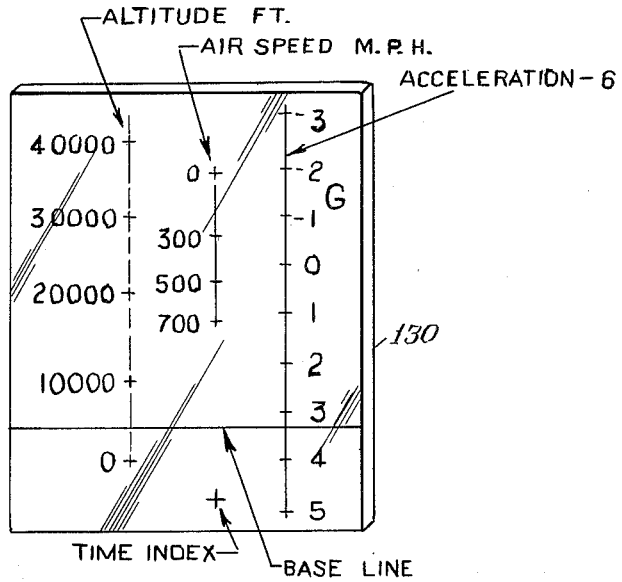
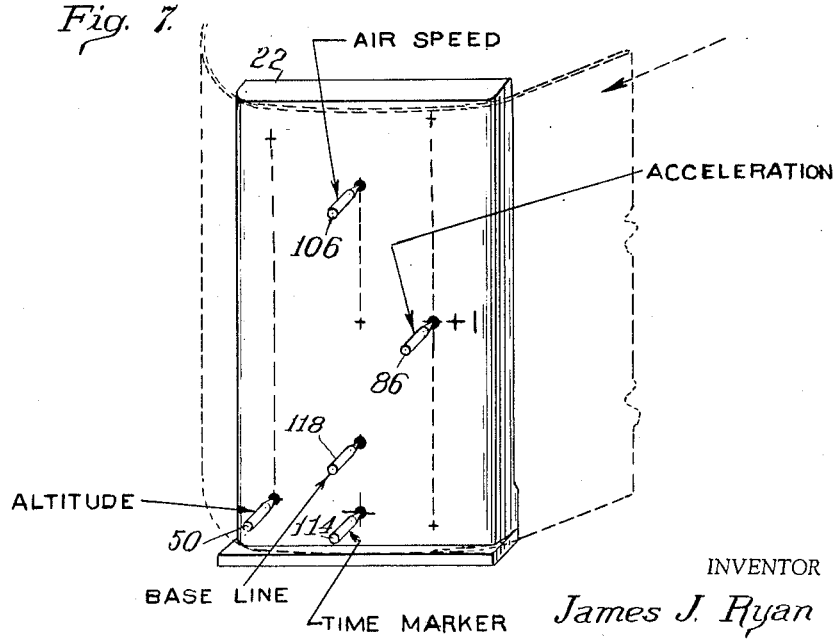

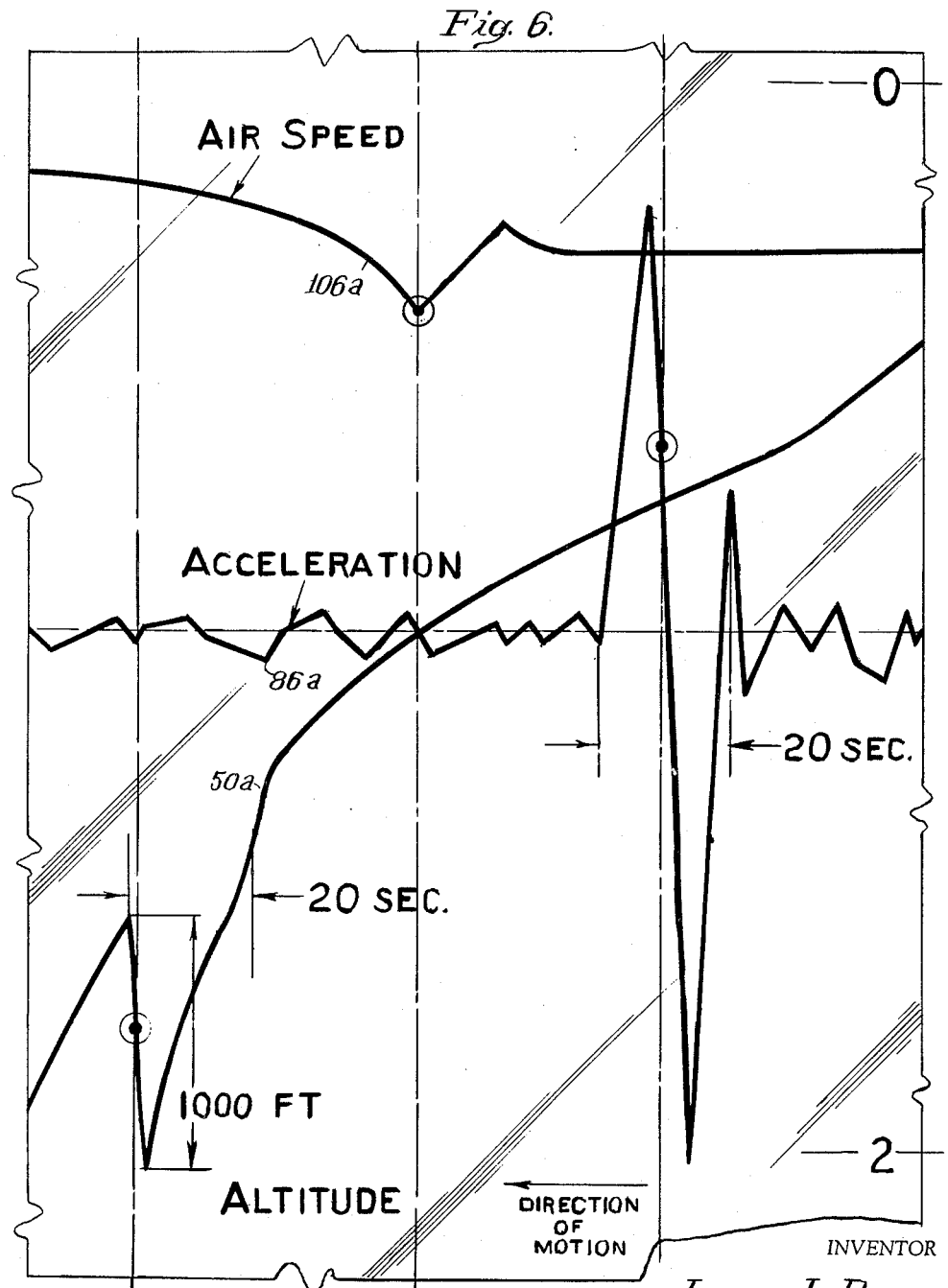

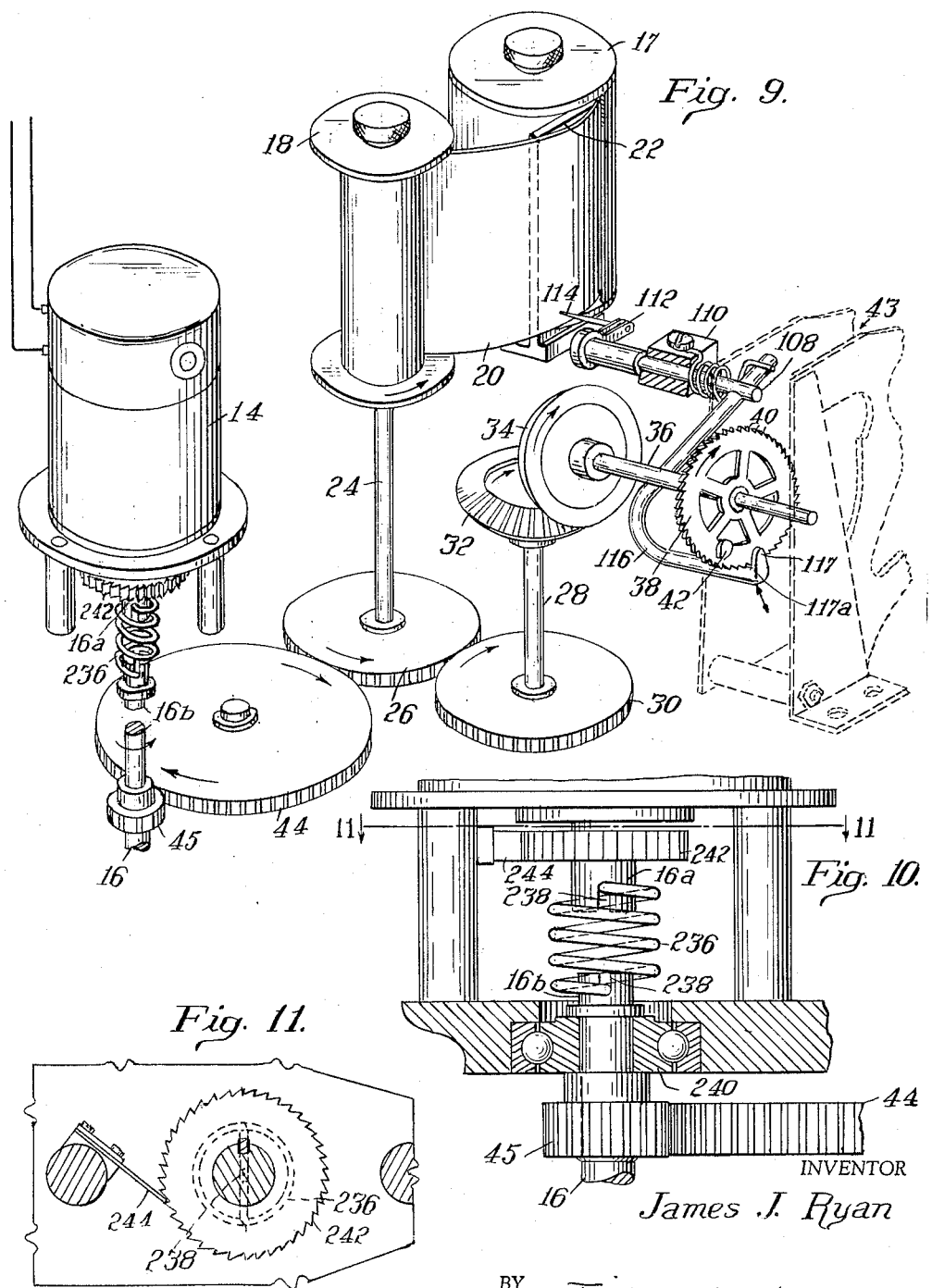

United States Patent Office 2,959,459
Patented Nov. 8, 1960

2,959,459

FLIGHT RECORDER

James J. Ryan, 52 N. Mississippi River Blvd.,
St. Paul W4, Minn.

Filed Aug. 4, 1953, Ser. No. 372,343

4 Claims. (Cl. 346—7)

This invention relates to a recording device for continuously recording certain of the phenomena encountered in aircraft flights, and more specifically relates to a recording device for use in continual monitoring of velocity, vertical acceleration, altitude, and other information for extended periods of time of an aircraft in flight, and for keeping a correlated time record of flight conditions.

Considerable effort, both by Government agencies and private industry is being expended to increase the safety of aircraft. This effort is continuous from the time the initial design is proposed until such time as the use of the aircraft is finally discontinued. During the period the aircraft is in operation its performance is under constant surveillance of the air-crew and aircraft inspectors. When an aircraft is involved in a crash numerous investigations are conducted to determine the cause of the crash in order to initiate corrective procedures to avoid future crashes.

It is further desirable to record flight information for study by the operations departments of air line, corporation, private, and Government service aircraft to obtain economy of operation and maintenance.

Meterologists and weather observers need statistical data from many flights to aid them in their understanding of atmospheric disturbances.

Due to the present lack of a practical device which will give a permanent record of flight phenomena, current practice is to rely on the visual observations of the aircraft instruments made by the air-crew during aircraft flights. This method of recording flight data has distinct limitations. In the case of crashes, often the air crew is killed and the data destroyed. In those instances where the air crew is available, because of physical limitations, visual observations of all instruments cannot be instantaneous, which in many situations is necessary in order to establish correlation between the various flight conditions especially as existing at the time of a crash.

Many recording devices which will simultaneously record pre-selected phenomena are presently available. However, due to size, weight or ability to be operated for only a limited period of time, these recording devices do not readily lend themselves for use in all aircraft for continuous operation. This invention relates to a compact, light weight recording device for use in aircraft capable of operating from the normal twenty-eight volt aircraft electrical system continuously for periods of time up to 300 hours, for example.

The principal object of this invention is to provide a compact recording device for continuously recording the altitude, air-speed, and vertical acceleration, at all instants of time of an aircraft in flight. Simultaneously, there may also be recorded remote conditions such as vertical acceleration at the center of gravity, engine torque as developed by pressure indicators, or aircraft heading established by remote compasses.

A further object of this invention is to provide a compact recording device of the nature described which can be incorporated with little modification into aircraft currently in use.

A further object is to provide a compact recording device, the record sheet of which is moved at a constant speed when used with the conventional aircraft electrical system.

A further object is to provide an aircraft flight recorder which will automatically monitor and record on a tape or foil driven at constant speed, the altitude, airspeed, vertical acceleration, and time of flight without aid or assistance from the air-crew.

A still further object is to provide a compact recording device of the nature described which is rugged in construction and can be so positioned in the aircraft to withstand destruction by fire and impact in the majority of aircraft crashes.

The recorder comprises a recording tape driven by an electric motor, and regulated to drive the record tape at a constant speed, by the use of a clock escapement mechanism, a recording member or stylus actuated by the motor drive to record a time reference line on the recording tape, an aneroid-actuated recording member or stylus for recording altitude on the tape, a recording member or stylus actuated preferably by a diaphragm bellows for recording airspeed, and a weight-operated recording member or stylus for recording acceleration perpendicular to the floor of the aircraft on the said recording tape, all of the said recording media being longitudinally displaced along the tape to allow simultaneous recording across the full width of the tape, and avoiding interference between the various styli. In addition to the aforementioned styli the recording device further includes an additional recording member or stylus adapted to be connected through suitable electrical connections to a remote instrument for recording graphically the readings of said instrument on the recording tape.

Referring now to the annexed drawings illustrating a recorder embodying the features of the present invention:

Fig. 2 is a schematic perspective diagram of the various elements of the assembly of Fig. 1;

Fig. 5 is an enlarged view of a typical portion of the embossed recording tape;

Fig. 6 is an enlarged view of the section of the tape indicated by the dash lines at the center of Fig. 5;

Fig. 7 is a diagrammatic view of the recording tape and styli showing the longitudinal spacings of the various styli;

Fig. 8 is a plan view of the overlay templet used in the analysis of the graphs on the record tape;

Fig. 9 is a perspective view, showing on a larger scale, the driving connections between the motor, take-up spool and clock escapement and also showing a modification of the motor drive;

Fig. 10 is an enlarged side view of a part of Fig. 9;

Fig. 11 is a section on line 11—11 of Fig. 10.

Figure 1:
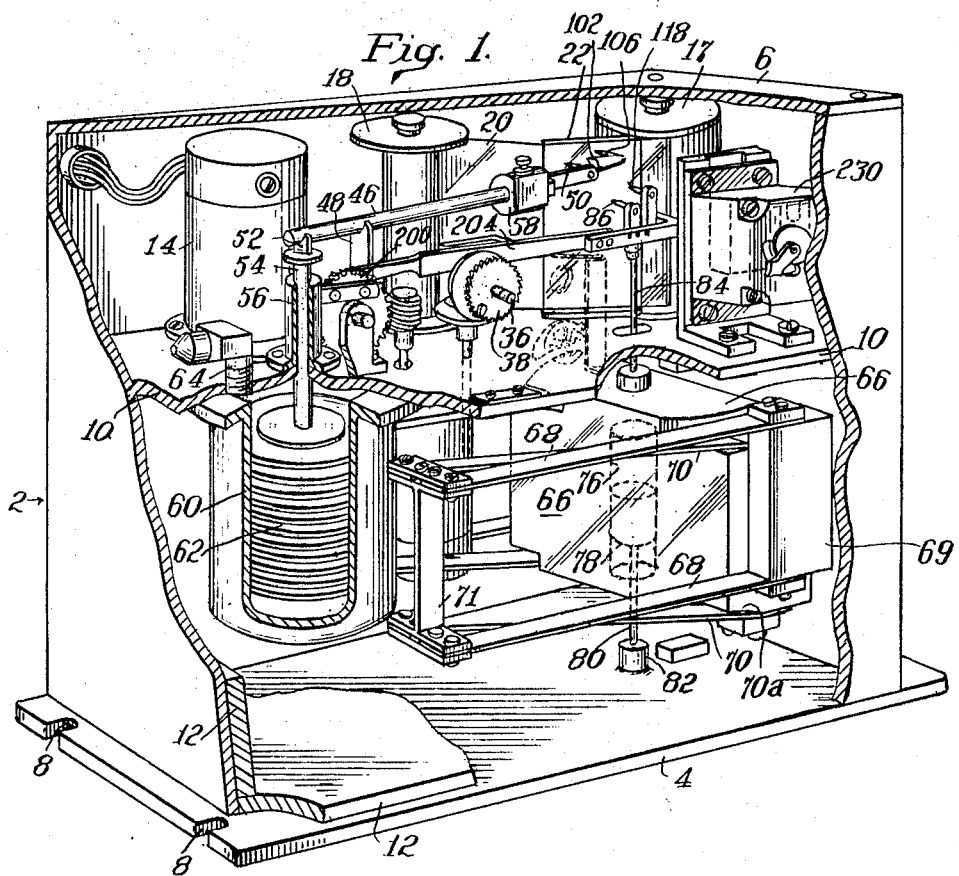
Figure 1 is a perspective view, partly in section, of the recorder assembly, the casing being broken away.

Referring now to the drawings, 2 denotes a housing, having a bottom cover or base plate 4 and a top cover 6. The base plate 4 extends beyond the sides of the housing 2 and is provided with slots 8 for the reception of suitable bolts or studs, for attaching the housing to a portion of the aircraft structure. The housing is fairly strong and heavy and insulated, to protect the contents from crash and fire as far as possible.

A supporting plate 10 is fixed to the housing 2 intermediate the top and the bottom thereof. The interior surfaces of the housing 2 and covers 4 and 6 may be provided with a lining of asbestos or other suitable insulating material, generally indicated at 12, and may in addition be provided with a suitable thermostatically controlled heating means for use in extreme cold temperatures.

An electric motor 14, having a motor shaft 16 (see Fig. 2), is carried by the support 10, the shaft 16 passing through the support 10. The motor is preferably a 28 volt, direct current motor, and operates at a reduced voltage as a stalled motor to exert a steady torque on its shaft 16. A tape supply spool or container 17 and takeup spool 18 are supported in spaced relationship on the upper surface of the support 10 and a recording tape 20 passes from the supply spool 17 to the take-up spool 18 across a platen 22 adjustably connected to the support 10 intermediate the spools 17, 18, all as described in more detail in my patent application Serial No. 371,665, filed July 31, 1953.

Referring to Figs. 2 and 9, a shaft 24, keyed at its upper end to the take-up spool 18 and provided at its lower end with a gear 26, is rotatably supported in the support 10. A second shaft 28, provided at its lower end with a gear 30 in mesh with the gear 26 and at its upper end with a bevel gear 32, is rotatably supported in the support 10. The shaft 28 is connected to a third shaft 36 through a bevel gear 34, as in Fig. 9. The shaft 36 carries intermediate its ends a timing wheel 38, Fig. 9, which has at its periphery a plurality of equally spaced teeth 40 and on its face a cam 42, said shaft 36 being attached at its end to a known type of clock escapement mechanism indicated generally at 43, Fig. 9, as disclosed and described in detail in my Patent 2,750,-552, dated June 12, 1956. This escapement comprises the usual train of gears, pallet, balance wheel and balance wheel spring commonly present in clock escapements.

Gear 26 meshes with, and is driven by gear 44, in turn driven by the motor shaft 14 through gear 45. The described connections to the take-up spool 18 and to the clock escapement 43 serve to stall the motor, the motor in turn exerting a steady operating torque on the take-up spool 18 and the clock escapement. The described connections from the motor to the spool and clock escapement are in parallel. The clock escapement acts as a governor on the speed of the motor and even if the motor should tend to speed up, the escapement prevents it from so doing, the excess power of the motor being absorbed by operating the balance wheel of the escapement mechanism at greater amplitude.

To describe the aneroid-operated altitude scriber, and referring to Figs. 1 and 2, an arm 46 is pivotally supported on a laterally flexible fulcrum 48 carried by the support 10. A stylus 50 is attached to one end of the arm 46 adjacent the recording foil or tape 20, the opposite end of the arm 46 being attached to a member 52. Member 52 is connected to a rod 54 which is guided for vertical movement in an aperture in the support 10 by a guide 56. A balance weight 58 is variably positionable on the arm 46 by a set screw for counterbalancing the arm.

A cylindrical housing 60 is fastened to the lower side of the support 10 below the guide 56. In the housing 60 is an aneroid bellows 62, preferably of the sylphon type which is connected at its upper part to operate the rod 54, arm 46 and stylus 50. An aircraft type pressure fitting 64 is connected to the upper end of the cylinder 60 and extends through the housing 2 for connection to the aircraft altimeter pressure line.

The measurement and recording of the vertical acceleration of the aircraft will now be described, reference being made to the parts shown in the lower part of Fig. 2.

An inertia mass 66, a relatively heavy block or cube of metal, is supported in the lower part of the housing 2 for frictionless vertical motion by a plurality of double cantilever-beam springs 68 and 70. The four "outgoing" springs 68 are secured at their inner ends to blocks 69, fixed in the housing. The outer ends of the four springs 68 are secured to the upper and lower parts of two floating spacer brackets 71. The outer ends of "ingoing" springs 70 are attached to the upper and lower parts of brackets 71, the inner ends of the springs being attached to shoulders 70a on mass 66 to resiliently support the inertia mass 66, so that this mass may oscillate vertically in a straight line. The deflection of mass 66 vertically is practically a linear deflection. Mass 66, usually weighing about one pound, preferably has about one-fourth inch displacement per unit of gravity. It is capable of measuring 5 G upward acceleration and 3 G downward acceleration, and has a linear displacement of about two inches. The natural frequency of this mass 66 is about 375 cycles per minute and is provided with an air dashpot which reduces the free oscillations by a critical damping of about 0.4. Under static conditions, it is positioned to scribe a straight line along the center of the record foil.

The mass 66 is provided with an air dashpot, including a downwardly opening cylindrical bore 76 in 66. A piston 78, of a diameter slightly smaller than the bore 76, is held in said bore 76 by a flexible rod 80 fixed at one end to the piston 78 and at its opposite end to a boss 82 on the base 4.

A post 84 is attached to the top of the mass 66 and is provided at its upper end with a stylus 86 in contact with the recording tape 20 adjacent the platen 22, the support 10 being slotted to allow the post 84 to pass therethrough.

Figure 1A:
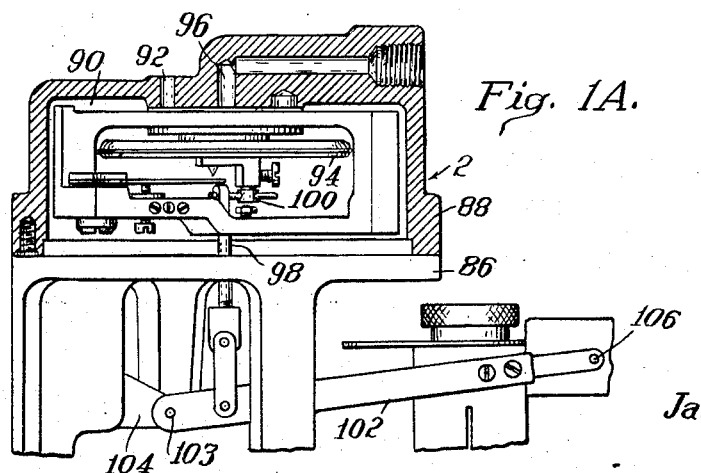
Fig. 1A is an enlarged side view, partly in section, of the air-speed indicating element.

Referring now to a known type of air speed indicator shown in Fig. 1A, the housing 2 is provided at its upper extremity with a horizontal shelf 86. An air speed indicator housing 88 is positioned above top cover 6, as by a shelf 86 secured to the cover and extending above it. The air speed indicator includes the air tight chamber 90; a passage 92 extends through the upper wall of the housing 88 for connecting the chamber 90 to the static pressure line of the Pitot-static tube in parallel with the air speed indicator located in the air-crew compartment of the aircraft. A diaphragm bellows 94, positioned within the chamber 90, is connected at its upper side by a passage 96 in the housing 88 to the dynamic pressure line as for the cockpit instrument air-speed indicator. A rod 98 is connected at its upper end through a suitable link 100 to the lower side of the bellows 94, the lower end of the rod 98 being connected to scriber arm 102 between its ends. One end of the arm 102 is pivotally connected at 103 to a projection 104 on the housing 2 and the other end of said arm carries a stylus 106 which contacts the recording tape 20 adjacent the platen 22.

The time-line scriber comprises a shaft 108, Fig. 2 and Fig. 9, rotatably supported on the support 10 in a bearing block 110 and connected at one to a transverse arm 112, which carries stylus 114 which marks the recording tape 20 adjacent the platen 22. The opposite end of the shaft 108 is connected to one leg of an L-shaped transverse arm 116, the other leg of which is provided at its end with two cam surfaces 117 and 117a which are positioned to contact respectively the cam 42 and teeth 40 of the timing wheel 38 in the manner disclosed and described in more detail in patent application Serial No. 371,665, filed July 31, 1953. There are sixty teeth 40 on wheel 38. The parts described actuate stylus 114 to scribe a time line on the record tape, this time line showing a peak for each second, controlled by teeth 40 and a higher peak for each hour, as controlled by cam 42.

A base line stylus 118, Fig. 2, in contact with the recording tape 20 adjacent the platen 22 is fixed to the upper end of a pedestal 120, the lower end of the pedestal being fixed to the support 10.

In operation, the electric motor 14 is connected through a resistance to the electrical system of the aircraft by a master switch located in the pilot's compartment. It is intended that the switch 122 will be closed and the recorder in operation during all periods that the aircraft is in flight. The motor 14 drives the take-up spool 18 through the gears 44 and 26 thereby causing the recorder tape 20 to be drawn across the platen 22.

In order to feed the recording tape 20 at a relatively slow constant speed despite variations in the line voltage to the motor and changes in torque requirements of the recorder due to fluctuations of the styli on the recording tape or imperfections in the tape, the take-up spool drive gear 26 is connected to a clock escapement mechanism as described. Since the clock escapement mechanism allows the motor 14 to turn the take-up spool 18 only at the speed for which the escapement mechanism is set, the motor 14 will be partially stalled. As the input voltage to the motor and the torque requirements of the recorder vary the degree to which the escapement mechanism stalls the motor will vary in direct proportion. In this manner the recording tape will be driven at a constant speed, despite variations in input or load.

In the preferred form of the invention the escapement mechanism is geared to allow the take-up spool to be turned at the rate of one revolution per hour. When operated at this speed, a recording tape 110 feet in length will provide a record of 300 hours of continuous operation of the recorder. Since the take-up spool, which drives the recording tape, will be driven at constant speed throughout the operation of the recorder the rate of feed of the tape across the platen will vary as the amount of recorded tape on the take-up reel increases. When a new spool of recording tape is installed in the recorder the rate of feed will be approximately three inches per hour and will increase gradually to a rate of five inches per hour at the end of the 300 hour recording cycle. This variation is taken care of by comparison with the time line embossed by stylus 114, Fig. 9.

In order that the recording tape may be read relative to particular time increments, the time-line stylus 114 is operatively associated with a timing wheel 38 on the clock escapement mechanism, the timing wheel 38 being provided with sixty equally spaced teeth 40 around its periphery and a cam member 42 on its face. Due to the gearing arrangement, the timing wheel 38 turns at the same rate as the take-up spool 18. As each of the teeth 40 passes the arm 116 the arm will move causing the stylus 114 to emboss a sawtooth mark 114a each second on the recording tape 20, the cam member 42 causing greater movement of the arm 116 resulting in a more pronounced marking 114b each hour, once for each revolution of wheel 38, as shown in Fig. 5.

As the tape 20 is fed across the platen 22, the airspeed, altitude and vertical acceleration of the aircraft are embossed on the tape by the various styli simultaneously with the time record. The air speed stylus 106 is actuated in the same manner common to aircraft air-speed indicators. The chamber 90 is connected to the static or altitude pressure of the aircraft and the dynamic pressure obtained from the Pitot-static tube is vented into the bellows 94 located in the chamber 90. The expansion and contraction of the bellows 94, therefore, is determined by the difference between static and dynamic pressure which is the accepted means of measuring air speed. By connecting the bellows 94 to the stylus 106 by the rod 98 and the arm 102 the air speed is graphically embossed by stylus 106 on the recording tape 20, as shown by line 106a, Fig. 5.

The altitude recording stylus 50 is also actuated in a manner common to aircraft instrumentation. The chamber formed by the housing 60 is vented to the altitude air pressure. This air pressure will allow the aneroid 62 located in the housing 60 to expand and contract in the usual way. By connecting the aneroid 62 to the stylus 50 the altitude will be embossed graphically on the tape 20 as shown by line 50a, Fig. 5. In order to avoid variance in altitude reading because of temperature the aneroid 62 is filled with an inert gas which serves as a temperature compensator.

The scriber or stylus 86 actuated by the inertia mass 66 embosses the vertical accelerations or G forces on the tape 20, as shown by line 86a, Fig. 5. Due to the novel suspension of the inertia mass by the double cantilever-beam springs 68, 70 and floating spacer brackets 71, the mass 66 and the stylus 86 will move in a vertical straight line. It has been found that the vertical acceleration measured at the tail of the aircraft is practically the same as that measured at the center of gravity. Thus only a single acceleration measurement may be necessary, which would be taken in the tail of the aircraft.

In order to avoid any interference between the styli and at the same time to allow maximum travel of each stylus across the width of the recording tape the styli may be displaced approximately ¼ inch longitudinally along the tape as shown in Fig. 7.

To provide a reference line for calibration purposes and for the transposition of the graphic lines on the recording tape to numerical readings, a fifth fixed stylus 118 embosses a reference line 118a on the tape 20. In calibrating the recorder and transposing the graphs, all readings are made relative to this reference or base line, 118a.

The recording tape and the styli may be of any material capable of permanently receiving and making a marking. However, due to the use for which this recorder is intended, i.e., a flight recorder which will withstand severe shocks and high temperatures, a full-hard aluminum foil approximately .001 inch thick and 2¼ inches wide is preferred. This foil may be coated with layout blue for ease in observing the traces of the styli. Small Carboloy rods with spherical points which emboss the aluminum foil as it passes over the platen 22 are suitable for use as styli.

The recording tape 20 may be accurately read by passing the marked tape under a tool maker's microscope. For high speed statistical analysis, the record tape may be perforated in coordination with the position of the styli markings and read through an electromechanical tabulating device. For immediate study, a transparent template, such as that shown at 130 in Fig. 8 of the drawings, may be used. This transparent template is positioned over the section of the tape for which numerical values of the tape record are desired with the base line marking of the template coinciding with the base line marking on the tape and the time index marking of the template coinciding with the desired time instant on the tape. As shown in Fig. 7, the altitude, air speed and acceleration markings on the template are off-set from the time index marking in the same manner as the styli are off-set on the tape. In this manner the readings obtained from the template will be simultaneous in time for any setting.

The recording device as disclosed above is a compact, lightweight instrument which can be used continuously for periods up to about 300 hours. The over-all outside dimensions of the instrument are approximately nine inches long, six and a quarter inches wide, and ten and three-quarters inches high, having a total weight of about ten pounds. The recorder is a self-contained unit which can be incorporated into aircraft now in use by merely bolting the recorder housing to the aircraft structure so that the recorder is vertical to the normal flight path, plugging the electric motor into the conventional aircraft electrical system and inter-connecting the air-speed and altitude units of the recorder with the conventional aircraft instrument pressure lines. Once the recorder is installed in the aircraft the only servicing required is the periodic changing of the recording tape.

Figure 4:
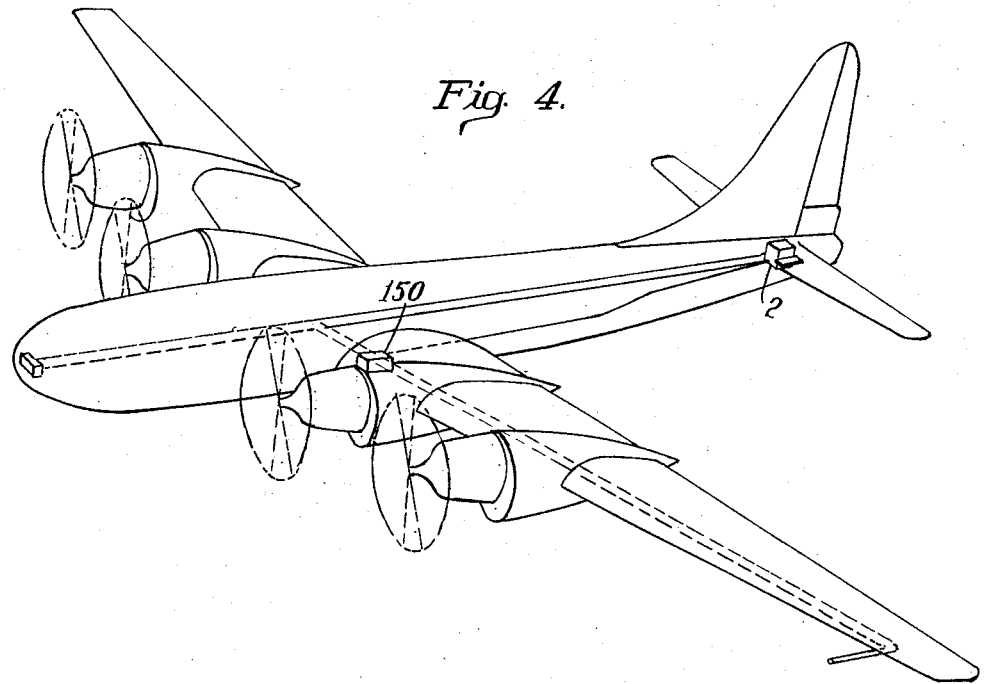
Fig. 4 is a diagrammatic view of the recording device in a conventional aircraft, showing the connections to the airspeed indicator, the altimeter aneroid element and the relative location of the remote gravitational acceleration sensing device.

The location of the recorder in the aircraft is not critical insofar as accuracy of the recorder is concerned; therefore, the recorder may be mounted at any convenient point in the fuselage, so long as the recorder is vertical to the normal flight path of the aircraft. Experience has shown, in the event of aircraft crashes, that the tail section of the aircraft is in most instances the least likely portion of the aircraft to be destroyed. In order to insure the availability of flight records in the event of aircraft crashes to the greatest possible extent, one location for the recorder 2 is in the tail section as shown in Fig. 4 of the attached drawings. It has been observed that the vertical or gravitational acceleration measured at the tail of the aircraft is practically the same as that measured at the center of gravity.

Fig. 2 shows the vertical acceleration indicating mass 66 within the instrument housing and operating scriber 86; the entire instrument could be mounted in the airplane substantially at its center of gravity or the instrument could be mounted in the tail of the aircraft, and an additional or substitute acceleration sensing weight assembly mounted at the center of gravity of the airplane and its readings transmitted electrically to the instrument through a balancing potentiometer and small reversing motor controlled thereby, as will now be described.

Figure 3:
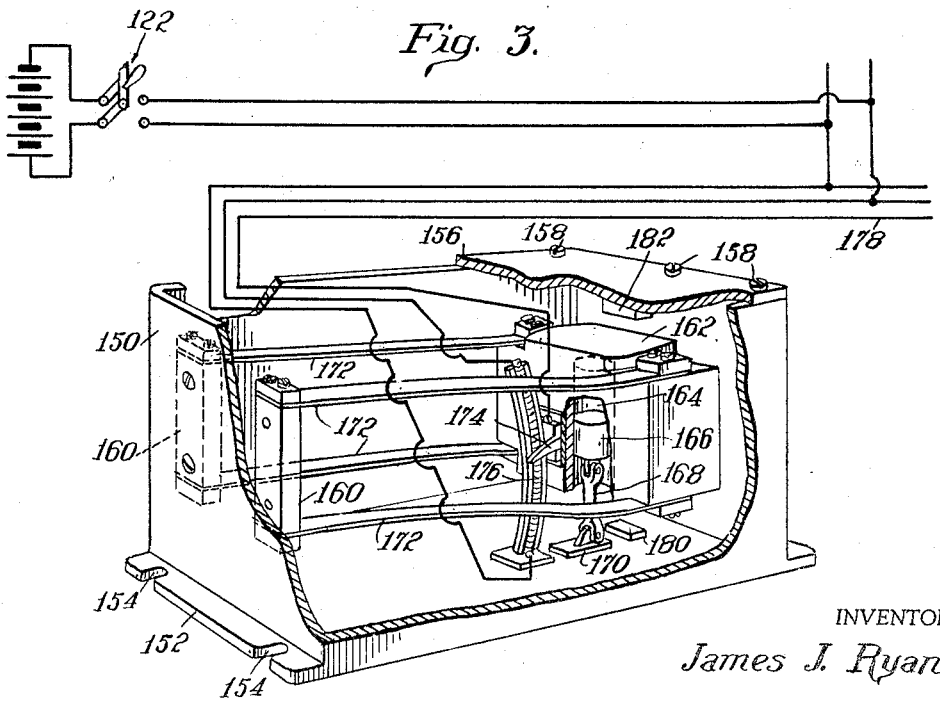
Fig. 3 is a perspective view, partly in section, of the remote gravitational acceleration sensing device.

The remote gravitational accelerometer may be of the type shown at the lower part of Fig. 2, or may be as shown in Fig. 3, comprising a housing 150 having a base 152 provided with slots 154 for bolts for attaching the housing 150 in place in the aircraft. The housing has a removable cover 156 attached by screws 158. Two supports 160 are bolted to one end of the housing 150.

An inertia mass 162, conveniently cubical in shape, is located in the end of the housing 150 opposite supports 160. The mass 162 is provided with a cylindrical dashpot bore 164 and a piston 166 movable therein. A connecting rod 168 is povotally connected at one end to the piston 166 and at its opposite end is pivotally connected to a plate 170 fixed to the housing 150 in such a manner to allow the piston 166 to be moved out of vertical alignment with the plate 170, forming an air operated dashpot analogous to 78, Fig. 3. Four leaf springs 172 are attached, one each, to the four horizontal corners of the mass 162 at one of their ends and at their opposite ends to the upper and lower horizontal portions of the supports 160. An electric contact 174 is attached to the face of the inertia mass 162 and is adapted to slidably contact a resistor 176 fixed to the housing 150 adjacent the inertia mass 162. The resistor 176 is connected to the aircraft electrical system by suitable electrical connections and the contact arm 174 is connected to suitable leads 178. The housing 150 is provided with a stop 180 adjacent the bottom of the mass 162 and the top 156 is provided with a stop 182 adjacent the top of said mass.

In operation, the housing 150 is bolted in place to the aircraft in such a manner that the motion of the mass 162 will be vertical to the normal line of flight of the aircraft. The inertia and the spring forces acting on the mass 162, will be in equilibrium when the housing 150 is moved vertically during gravitational accelerations of the aircraft. During such acceleration relative movement will take place between the mass 162 and housing 150, and the slide contact 174 will be moved relative to the resistor 176 in the same manner as the slide on a variable rheostat, thereby changing the voltage potential in the lead 178. This voltage potential is fed by the lead 178 to the recorder to record the degree of travel of the mass 162 on the recording tape 20 in a manner hereinafter described.

Referring now to Fig. 2, a gear 200 is rotatably supported on a pedestal 202 fixed to the support 10. An arm 204 is pivoted at one end to the gear 200 and is provided at its opposite end with a stylus 206 in contact with the recording tape 20 adjacent the platen 22. A second arm 208 provided with a slide contact 210 intermediate its ends is attached at one end to the gear wheel 200 and carries at its opposite end a counter-weight 212, the counter-weight 212 being of sufficient weight to counter-balance the arm 204. A resistor 214 is supported adjacent the wheel 200 by a bracket 216 fixed to the support 10. The resistor 214 is connected at its opposite ends to the aircraft electrical system and is slidably contacted by the contact 210 intermediate its ends, the resistor 214 and contact 210 forming a variable rheostat, the voltage potential of which is transmitted by a suitable lead 220.

A reversible motor 222, having a drive shaft 224, which carries a worm gear 226 at its upper end is in driving mesh with the gear 200. As the motor 222 turns the shaft 224 and worm 226 the wheel 200 will be rotated thereby causing the slide 210 on the arm 208 to change its position relative to the resistor 214 and further causing the stylus 206 to move relative to the recording tape 20. The reversible motor 222 is connected to the aircraft electrical system through a reversing switch galvanometer of a well known type, generally indicated at 230 in Figs. 1 and 2 of the drawings, the slides 174 and 210 of the variable resistors 176 and 214 being connected to the galvanometer 230 by the leads 178 and 220 respectively.

In operation, with the mass 162 at rest, the slide 174 will be positioned at approximately the mid-point of the resistor 176 and the slide 210 will rest at approximately the mid-point of the resistor 214. At this time the system will be electrically balanced, the motor 222 will be at rest and the stylus 206 will emboss a straight horizontal line on the recording tape 20.

Should the housing 150 be accelerated vertically in either direction the inertia weight will cause the slide 174 to move on the resistor 176 thereby electrically unbalancing the system and causing the reversing switch galvanometer 230 to be tripped. With the galvanometer tripped, current will flow from the aircraft electrical system to the motor 222, causing the motor 222 to rotate thereby rotating the worm 226 and the gear 200. As the gear 200 rotates the arm 208 attached to the gear 200 will adjust the slide 210 on the resistor 214 until the system is again electrically balanced. With the system electrically balanced, the reversing switch 230 will open and the motor 222 will be de-energized until such time as the system is again out of electrical balance due to movement of the mass 162 relative to the housing 150, at which time the electrical adjusting cycle will be repeated. Due to the reversing galvanometer 230 the motor 222 may be rotated in either direction, the direction of movement being dependent on the direction of movement of the mass 162 in the housing 150. As the motor 222 rotates the gear 200, the arm 204 will move the stylus 206 on the recording tape 20, thereby causing a graphic record of the gravitational acceleration forces at the housing 150 to be embossed on the tape 20.

While the remote potentionometer 174, 176 is disclosed and described as attached to a gravitational acceleration sensing device, it is obvious other sensing devices for which a permanent record is desired could be substituted. For example, the slide 174 could be attached to a pressure responsive means which is in turn connected to an aircraft engine torque indicator. In such a system the stylus 206 would record engine torque, and indirectly engine horsepower, on the recording tape 20.

A modified driving connection from the motor 14 to the take-up spool 18 and clock escapement 43 is shown in Figs. 9, 10 and 11. The motor shaft is in two parts 16a and 16b, connected to each other by a helical, torsion absorbing spring 236, the ends of which are slotted as at 238 to receive the ends of the spring. Shaft 16a has keyed thereto a ratchet wheel 242, with which a light pawl 244 engages for preventing reverse rotation. Shaft 16b is mounted in an anti-friction bearing 240 and carries gear wheel 45, which, as in Fig. 2, drives the gear 44.

The spring 236 acts as a torsion-absorbing spring and in normal operation acts to store up sufficient torque so that even if the motor stops, as in a crash, enough energy is stored up in the spring to continue the driving of the take-up spool for several minutes.

I claim as my invention:

1. A vertical acceleration responsive device comprising a housing, a weight, a pair of floating spacer brackets, two pairs of superimposed outwardly and horizontally extending flat springs, the ends of which are respectively secured to the housing and to the top and bottom of respective brackets, and two pairs of superimposed inwardly and horizontally extending flat springs, the outer ends of which are respectively secured to the top and bottom of said brackets and to said weight for supporting said weight for vertical oscillation.

2. A vertical acceleration responsive device comprising a housing, a weight, two pairs of superimposed horizontally extending flat springs, two floating vertically extending spacer brackets, the inner ends of each of said springs being secured to the housing, the outer ends of a superimposed pair of springs being secured respectively to the top and bottom of one of said spacer brackets, the outer ends of the other pair of superimposed pair of springs being secured respectively to the top and bottom of the other bracket, a third pair of superimposed horizontally extending flat springs respectively connected to the top and bottom of one of said spaced brackets and to said weight, and a fourth pair of superimposed, horizontally extending flat springs, respectively, connected to the other spacer bracket and to said weight.

3. In a recording device, a housing, an electric motor fixed to said housing, a take-up spool rotatable in said housing, a record tape connected with said take-up spool, a gear attached for rotation with said take-up spool, a driving connection between said electric motor and said take-up spool, a clock escapement mechanism connected with said motor and acting as a governor thereon thereby stalling said electric motor and allowing it to move at a very slow, substantially constant speed, a time indicating wheel on said escapement mechanism, stylus means for indicating increments of rotation of said time indicating wheel on said record tape, a vertical acceleration responsive device supported in said housing for vertical movement therein, means for recording movement of said acceleration responsive device on said tape, said vertical acceleration responsive device comprising a weight having an upper and a lower horizontal surface, a cylindrical bore open at its lower end in said lower surface, a piston having a diameter slightly less than the diameter of said bore located in sliding relationship in said bore, and a fixed connection between said piston and said housing, said piston and said bore cooperating to form a damper on said weight when said weight is oscillated vertically.

4. The combination of claim 3, wherein said vertical acceleration responsive device comprises a stationary support fixed to said housing, a plurality of pairs of flat springs, a weight and a floating spacer bracket, each of said pairs of flat springs comprising a first flat spring fixed at one end to said stationary support and at its opposite end to said floating spacer bracket, and a second spring fixed at one end to said floating spacer bracket and at its opposite end to said weight.

References Cited in the file of this patent

UNITED STATES PATENTS

| | | |
|---|---|---|
| 853,878 | Hawley | May 14, 1907 |
| 1,588,422 | Howell | June 15, 1926 |
| 1,659,028 | Holtz | Feb. 14, 1928 |
| 1,794,685 | Hayman et al. | Mar. 3, 1931 |
| 2,000,527 | Linderman | May 7, 1935 |
| 2,034,543 | Jwiss et al. | Mar. 17, 1936 |
| 2,153,317 | Sigo | Apr. 4, 1939 |
| 2,159,181 | Ryder | May 23, 1939 |
| 2,214,522 | Chappell et al. | Sept. 10, 1940 |
| 2,232,982 | Tank | Feb. 25, 1941 |
| 2,291,475 | Kellogg et al. | July 28, 1942 |
| 2,359,245 | Ritzmann | Sept. 26, 1944 |
| 2,399,574 | Russell | Apr. 30, 1946 |
| 2,414,976 | Redhed | Jan. 28, 1947 |
| 2,421,834 | Crowther | June 10, 1947 |
| 2,557,437 | Jepson | June 19, 1951 |
| 2,564,705 | Maynard | Aug. 21, 1951 |
| 2,614,239 | Smith et al. | Oct. 14, 1952 |
| 2,640,900 | Klose | June 2, 1953 |
| 2,672,334 | Chenery | Mar. 16, 1954 |
| 2,702,186 | Head et al. | Feb. 15, 1955 |
| 2,750,552 | Ryan | June 12, 1956 |
| 2,773,733 | Lorenz | Dec. 11, 1956 |

FOREIGN PATENTS

| | | |
|---|---|---|
| 65,083 | Austria | June 10, 1914 |
| 589,829 | Great Britain | Jan. 16, 1945 |
| 595,239 | Great Britain | Dec. 1, 1947 |